April 5, 1932.  E. B. CARNS ET AL  1,852,146

RESILIENT COATING

Filed Sept. 25, 1929

John A Grimes and Edmund B. Carns INVENTORS

BY their

Hoguet & Neary ATTORNEYS

Patented Apr. 5, 1932

1,852,146

UNITED STATES PATENT OFFICE

EDMUND B. CARNS AND JOHN A. GRIMES, OF NAUGATUCK, CONNECTICUT; SAID GRIMES ASSIGNOR TO THE NAUGATUCK CHEMICAL COMPANY, OF NAUGATUCK, CONNECTICUT, A CORPORATION OF CONNECTICUT, AND SAID CARNS ASSIGNOR TO CAIRNS DEVELOPMENT COMPANY, OF WILMINGTON, DELAWARE, A CORPORATION OF DELAWARE

RESILIENT COATING

Application filed September 25, 1929. Serial No. 395,019.

This invention relates to a resilient coating for aircraft and more particularly to a rubber coating for the structure used in metal aircraft construction.

Formerly in metal aircraft construction there have been certain inherent disadvantages which designers and builders have not overcome. One of these has been the noise developed in metal aircraft during flight due to the vibration and resonance built up from the noise of the motors and air currents past the wind exposed surfaces. In aircraft constructed of wood this effect is not so noticeable due to the deadening effect of the wood itself. On the other hand in metal aircraft construction, the sound is reflected and appears to build up in the metal wings and fuselage as resonance. This noise is so great that it has become a highly disadvantageous feature especially in commercial planes designed to transport passengers. There have been various attempts to overcome this difficulty by the use of bulk heads at various sections along the wing but this means has not been found satisfactory. There is also a great amount of noise of the tinny or rattling type developed in metal aircraft when a metal frame is covered with metal sheets due to the vibrations caused by the engine or the wind passing the surface.

Another disadvantage has been the corrosion or oxidation due to exposure to the weather or electrolytic actions set up between the metal parts.

A further disadvantage of aircraft construction, as compared with wood construction, is that metal aircraft being of a rigid type cannot take up a sudden shock or strain. Any shock or strain which they receive is transferred directly to the certain structural elements which are designed to withstand a load imposed at the point of application of the sudden shock. On the other hand, in a wooden construction there is a certain amount of resiliency and bending, so that when such a construction is subjected to a sudden shock, the strain is not transferred directly to a structural element but the entire structure will bend or form itself to withstand the shock. Because of this, it has sometimes been the case in metal aircraft that when they are subjected to a sudden shock or strain a structural element will fail, causing perhaps a failure of the entire structure or at least bringing about a dangerous condition.

One of the primary objects of our invention is to overcome the disadvantages stated above.

Other objects and advantages will become apparent from the following description and drawings, in which.

Figure 1:
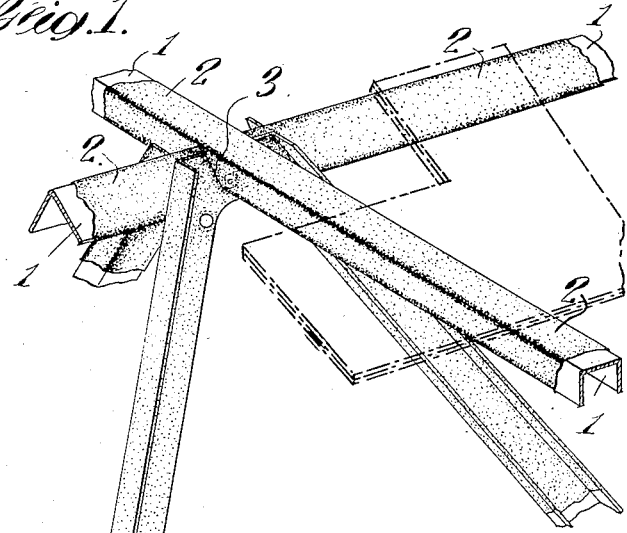
Figure 1 shows a perspective broken view of an aircraft structure.

Referring more particularly to the drawings in which like reference characters denote like parts, Figure 1 shows a portion of aircraft structure in which the entire frame has been covered with a rubber coating. All of the structure elements 1 have been joined together by rivets, bolts or other means, and the entire structure then coated with a rubber coating 2. It can be seen that the connecting point 3 in which several members are brought together, has been thoroughly protected by the rubber coating, so that there is no chance for moisture or other corrosion agents to come in contact with and between the several connected structural elements. A covering may be fastened to this structure with the result that there is a resilient material between the metal covering and the structure which acts both as an insulating medium and also as a sound deadening medium.

Figure 2:
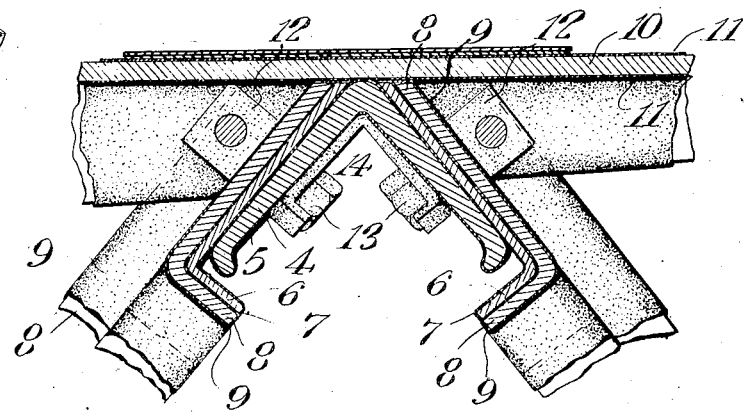
Figure 2 shows a cross sectional view of certain structural elements connected together.

In Figure 2 we have shown several structural elements joined together, each of these structural elements having been previously covered with a thin rubber coating. After these elements have been joined the entire structure may be covered with a rubber coating as shown in Figure 1. The structure of Figure 2 consists of a spar 4 which is covered with a rubber coating 5. Fastened to this spar are the strut elements 6 which are also covered with a rubber coating 7. Other struts 8 covered with rubber as shown at 9, rest against the struts 6 and are also connected to the spar 4. A rib 10 with a rubber coating 11 passes at right angles to the spar 4 and is fastened to the spar by means of the bolts 12 which pass through the struts 6 and 8 and are held fast by means of the nuts 13. The nuts are locked by means of a lock washer 14.

Figure 3:
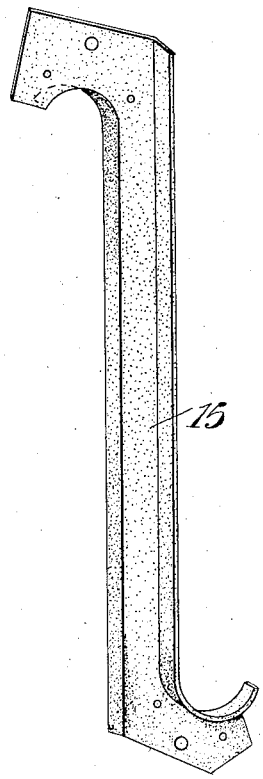
Figure 3 shows a single structural element.

Figure 3 merely shows an element 15 which has been coated with rubber prior to assembly in an aircraft structure.

The method of applying this rubber coating insists in sand blasting the metallic elements or structure in order to remove any extraneous matter and oily surfaces. This sand blasting therefore, gives a surface to the metal which is adaptable to the formation of a bond between the metal and rubber coating. The metal is then given preferably three coats of a rubber cement of the ordinary type or under certain circumstances, a hard rubber cement may be used. The cement acts to protect the surface in the interim between sand blasting and the actual coating. It also gives a perfect bond between the rubber and the metal due to its adhesive qualities. This rubber cement is then allowed to dry for approximately one hour or until it has become somewhat toughened and acquired its most adhesive properties. The metal element or structure is then dipped in or sprayed with latex. After this operation the metal is dipped in or sprayed with acid which coagulates the latex and forms a film of rubber upon the surface of the metal. The structure may then again be dipped in or sprayed with latex and this latex coagulated again with acid. The coating is thus built up to any desired thickness. In certain portions of the plane a thickness of less than $\frac{1}{16}''$ will be desired. In other portions of the plane such as those parts where a gasket effect or cushioning effect is desired, a greater thickness of rubber will be wished. After the desired thickness of rubber has been applied, the frame or structure elements are washed to remove the acid on the surface and are then put in a steam chamber of the usual type and the rubber allowed to cure for approximately three quarters of an hour, or until the proper properties have been obtained. The curing agent, of course, may be previously mixed with the rubber before it is sprayed on the structure.

We have been able to achieve therefore, by our method, a homogeneous resilient coating for metal aircraft structures. Because of this homogeneous coating we have found it is possible to obtain a metal aircraft which does not transmit or reflect sound and which is not susceptible to the building up of resonance in the wings or fuselage. This is due to the fact that the homogeneous rubber coating acts as a cushioning means on the surface of the metal somewhat similar to the sound deadening walls which are used in building construction and also the structure does not transfer sound through the metal parts inasmuch as the metallic elements are separated by a thin rubber film. We have also found that our homogeneous coating acts as a sound deadening medium between a metal covering and the metal frame. This is especially true on wings, rudders, stabilizers and other wind exposed surfaces. It is possible by means of our homogeneous coating to make a rudder consisting of a metallic frame and metallic covering which when pounded or jarred will not give a metallic rattle or tinny sound as has been the case with previous structures.

This homogeneous coating furthermore acts as a protective coating against corrosion or oxidation of the metallic elements of an aircraft structure. It has more advantageous properties than the usual lacquer or paint coatings inasmuch as it has a tenacious bond with the metal surface and ordinarily cannot be scraped or peeled from the metal so as to leave an exposed metallic surface. Its resiliency tends to make it a much more permanent covering than any of the paints, lacquers or dopes previously used.

We have found that by having such a rubber film between the structural elements making up the frame of an aircraft, none of the rigidity or structural characteristics of the aircraft are lost inasmuch as the frame may be bolted or riveted together in the usual manner. However, the rubber film gives to the rigid frame a certain, though slight flexibility. This flexibility is enough to take up sudden strains or shocks to which an aircraft is subjected and transfer such shocks over the entire structure rather than as is the case in the usual metallic aircraft construction, transfer a sudden shock to a single portion of the structure with the possible result of fracturing one of the structural elements.

Our rubber coating between the structural elements also overcomes one of the great and practically undetectable dangers inherent in metal aircraft construction namely, crystallization of the metal in the structural elements. This danger is of special importance in the elements supporting an engine but it is also present in any part of the plane in which vibration takes place due either to the transmission of a vibration to some far point by means of the metal frame, or due to the vibrations set up directly at that point by some external source such as the wind beating against a surface.

We have further found a means to overcome with our rubber coating the electrolytic actions which are set up in various portions of an aircraft between the metallic structural elements. These electrolytic actions are especially prevalent in seaplanes. By means of our homogeneous coating each of the metallic elements is segregated and insulated so that there is no danger of the metal being weakened due to electrolytic current causing the metal to go into solution.

We have shown the use of our homogeneous rubber coating in connection with an aircraft frame and as covering the separate elements making up such a frame. There are, of course, many other uses for such a resilient coating on aircraft, such as covering the interior or exterior of floats used in seaplane construction and as a covering for parts used in aircraft of wood construction. The resilient coating may also be used in place of the usual paint or lacquer covering the fuselage or wings or an aircraft.

Another use would be on the interior of a fuselage as a finish. In this use the coating would act not only as a finish but would also constitute a sound deadening and vibration deadening medium between the structural members in the fuselage and the fuselage covering. The coating may, of course, be made of various colors and as such many desirable effects can be obtained.

We therefore, do not wish to be limited by the specific forms disclosed in our specification and drawings but only by the appended claims.

We claim:

1. In a metal aircraft rigidly connected, structural elements and a continuous rubber coating on said structural elements.

2. A metal aircraft comprising rigidly connected structural members, and a continuous rubber coating covering the unit structural members and adhering to the same.

3. A metal aircraft having rigidly connected metal structural elements entirely covered with a thin adherent continuous rubber film.

4. An aircraft having a frame, a covering material for said frame, and a continuous rubber covering film adhering to said covering material.

5. An aircraft having a metal framework, a shock and vibration dampening material covering said framework and a metallic covering for said framework lying wholly without said shock and vibration dampening material.

6. In aircraft construction the combination of a structural framework, a continuous resilient rubber film covering said structural framework, and a metallic covering for said framework lying wholly without said continuous resilient rubber film.

7. In aircraft construction, the combination of a structural framework, a rubber coating for said framework and adhering to the same, a metallic covering for said framework and lying wholly without said rubber coating for said framework, and an adherent rubber coating for said metallic covering.

In testimony whereof, we have signed our names to this specification this 18th day of September, 1929.

EDMUND B. CARNS.
JOHN A. GRIMES.